(12) United States Patent
Aker

(10) Patent No.: US 7,864,102 B2
(45) Date of Patent: *Jan. 4, 2011

(54) VEHICULAR TRAFFIC SURVEILLANCE DOPPLER RADAR SYSTEM

(75) Inventor: John L. Aker, Estero, FL (US)

(73) Assignee: Applied Concepts, Inc., Plano, TX (US)

( * ) Notice: Subject to any disclaimer, the term of this patent is extended or adjusted under 35 U.S.C. 154(b) by 779 days.

This patent is subject to a terminal disclaimer.

(21) Appl. No.: 11/757,872

(22) Filed: Jun. 4, 2007

(65) Prior Publication Data

US 2010/0013699 A1    Jan. 21, 2010

Related U.S. Application Data

(63) Continuation of application No. 11/279,383, filed on Apr. 11, 2006, now Pat. No. 7,227,494, which is a continuation of application No. 11/059,476, filed on Feb. 16, 2005, now Pat. No. 7,038,614.

(51) Int. Cl.
G01S 13/42 (2006.01)
G01S 13/58 (2006.01)
G01S 13/91 (2006.01)

(52) U.S. Cl. .................................. 342/107; 342/114
(58) Field of Classification Search ................. 342/107, 342/114, 196, 104, 115
See application file for complete search history.

(56) References Cited

U.S. PATENT DOCUMENTS

| | | |
|---|---|---|
| 3,680,085 A | 7/1972 | Del Signore |
| 3,750,172 A | 7/1973 | Tresselt |
| 3,760,414 A | 9/1973 | Nicolson |
| 3,761,908 A | 9/1973 | Gehman |
| 3,898,655 A | 8/1975 | Tresselt |
| 4,003,049 A | 1/1977 | Sterzer et al. |
| 4,052,722 A | 10/1977 | Millard |
| 4,072,945 A | 2/1978 | Katsumata et al. |
| 4,123,719 A | 10/1978 | Hopwood et al. |
| 4,214,243 A | 7/1980 | Patterson |
| 4,219,878 A | 8/1980 | Goodson et al. |
| 4,282,524 A | 8/1981 | Eymann et al. |
| 4,435,712 A | 3/1984 | Kipp |

(Continued)

FOREIGN PATENT DOCUMENTS

FR    2747788 A    10/1997

OTHER PUBLICATIONS

Skolnik, Merrill I. "Introduction to Radar Systems," 1962, pp. 98-99, McGraw-Hill Book Company, Inc., New York.

(Continued)

*Primary Examiner*—Dan Pihulic
(74) *Attorney, Agent, or Firm*—Scott T. Griggs; Griggs Bergen LLP

(57) ABSTRACT

A vehicular traffic surveillance Doppler radar system and method for use of the same are disclosed. In one embodiment, the system comprises a modulation circuit portion for generating modulated FM signals. An antenna circuit portion transmits the modulated FM signals to a target and receives the reflected modulated FM signals therefrom. A ranging circuit portion performs a quadrature demodulation on the reflected modulated FM signals and determines a range measurement based upon phase angle measurements derived therefrom.

20 Claims, 9 Drawing Sheets

U.S. PATENT DOCUMENTS

| | | |
|---|---|---|
| 4,673,937 A | 6/1987 | Davis |
| 4,740,045 A | 4/1988 | Goodson et al. |
| 4,806,935 A | 2/1989 | Fosket et al. |
| 4,968,968 A | 11/1990 | Taylor |
| 5,049,885 A | 9/1991 | Orr |
| 5,083,129 A | 1/1992 | Valentine et al. |
| 5,134,406 A | 7/1992 | Orr |
| 5,135,302 A | 8/1992 | Hirako |
| 5,157,701 A | 10/1992 | Valentine et al. |
| 5,177,691 A | 1/1993 | Welles et al. |
| 5,206,651 A | 4/1993 | Valentine et al. |
| 5,270,720 A | 12/1993 | Stove |
| 5,300,932 A | 4/1994 | Valentine et al. |
| 5,305,007 A | 4/1994 | Orr et al. |
| 5,347,120 A | 9/1994 | Decker et al. |
| 5,525,996 A | 6/1996 | Aker et al. |
| 5,528,245 A | 6/1996 | Aker et al. |
| 5,528,246 A | 6/1996 | Henderson et al. |
| 5,563,603 A | 10/1996 | Aker et al. |
| 5,570,093 A | 10/1996 | Aker et al. |
| 5,691,724 A | 11/1997 | Aker et al. |
| 5,861,837 A | 1/1999 | Richardson et al. |
| 5,886,663 A | 3/1999 | Broxon et al. |
| 6,008,752 A | 12/1999 | Husk et al. |
| 6,121,919 A | 9/2000 | Ameen et al. |
| 6,198,427 B1 | 3/2001 | Aker et al. |
| 6,266,627 B1 | 7/2001 | Gatsonides |
| 6,384,768 B1 | 5/2002 | Kai |
| 6,417,796 B1 | 7/2002 | Bowlds |
| 6,501,418 B1 | 12/2002 | Aker |
| 6,580,386 B1 | 6/2003 | Aker et al. |
| 6,646,591 B2 | 11/2003 | Aker et al. |
| 6,679,702 B1 | 1/2004 | Rau |
| 6,744,379 B1 | 6/2004 | Aker et al. |
| 6,831,593 B2 | 12/2004 | Aker et al. |
| 6,831,595 B2 | 12/2004 | Isaji |
| 7,038,614 B1 | 5/2006 | Aker |
| 7,049,999 B1 | 5/2006 | Aker |
| 7,057,550 B1 | 6/2006 | Aker |
| 7,068,212 B2 * | 6/2006 | Aker et al. .................. 342/114 |
| 7,227,494 B2 | 6/2007 | Aker |
| 2002/0080062 A1 * | 6/2002 | Aker et al. .................. 342/114 |
| 2004/0257268 A1 * | 12/2004 | Aker et al. .................. 342/114 |
| 2006/0181449 A1 * | 8/2006 | Aker ......................... 342/107 |
| 2010/0013699 A1 * | 1/2010 | Aker ......................... 342/107 |

OTHER PUBLICATIONS

Definition of "double modulation" on the Institute for Telecommunication Sciences website (www.its.bldrdoc.gov); Boulder, Colorado, 1996.

* cited by examiner

VEHICULAR TRAFFIC SURVEILLANCE DOPPLER RADAR SYSTEM

CROSS-REFERENCE TO RELATED APPLICATIONS

This application is a continuation of U.S. patent application Ser. No. 11/279,383 entitled "Vehicular Traffic Surveillance Doppler Radar System," filed on Apr. 11, 2006, and issued on Jun. 5, 2007 as U.S. Pat. No. 7,227,494 in the name of John L. Aker; which is a continuation of U.S. patent application Ser. No. 11/059,476, entitled "Vehicular Traffic Surveillance Doppler Radar System", filed on Feb. 16, 2005, and issued on May 2, 2006 as U.S. Pat. No. 7,038,614 in the name of John L. Aker; both of which are hereby incorporated by reference for all purposes.

TECHNICAL FIELD OF THE INVENTION

This invention relates, in general, to police radar systems and, in particular, to a vehicular traffic surveillance Doppler radar system that is operable to determine the range of a target.

BACKGROUND OF THE INVENTION

The role of radar in traffic safety enforcement is widespread throughout the United States and the principal tool for police traffic surveillance is Doppler radar. In a police Doppler radar system, an emitted microwave frequency signal is reflected from a target vehicle, causing a change in the frequency of the signal in proportion to a component of the velocity of the target vehicle. The Doppler radar system measures the frequency differential and scales the measurement to miles per hour, for example, in order to display the velocity of the target vehicle to a policeman or other Doppler radar system operator. Using the existing frequency differential scheme, conventional police Doppler radar systems are capable of a high degree of accuracy with regard to vehicle speed measurements in environments having one target vehicle.

It has been found, however, that the existing police Doppler radar systems are not necessarily successful in environments having multiple vehicles in position to reflect the radar signal. In particular, identification of the vehicle whose speed is being displayed when multiple vehicles are in a position to reflect the radar signal has proven difficult due to "look-past error," which occurs in situations where the intended target vehicle in the foreground has a significantly smaller radar cross-section than an unintended target vehicle in the background. Accordingly, further improvements are warranted in the field of traffic surveillance Doppler radar systems.

SUMMARY OF THE INVENTION

A system and method are disclosed that provide for a vehicular traffic surveillance Doppler radar which substantially eliminates look-past error by determining the range and speed of vehicles in multiple vehicle environments. In particular, the range of the target may be utilized in a comparative fashion in a multi-vehicle environment to determine which vehicle is closer or the closest. Also, the range of the target may be utilized in conjunction with the speed and heading of the target to determine the risk of a collision between the target and a patrol vehicle.

In one embodiment, a system comprises a modulation circuit portion for generating modulated FM signals, such as double-modulated FM signals. An antenna circuit portion transmits the modulated FM signals to a target and receives the reflected modulated FM signals therefrom. A ranging circuit portion, which may include a quadrature circuit portion and a processing circuit portion, performs a quadrature demodulation on the reflected modulated FM signals and determines a range measurement based upon phase angle measurements derived therefrom.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1A:
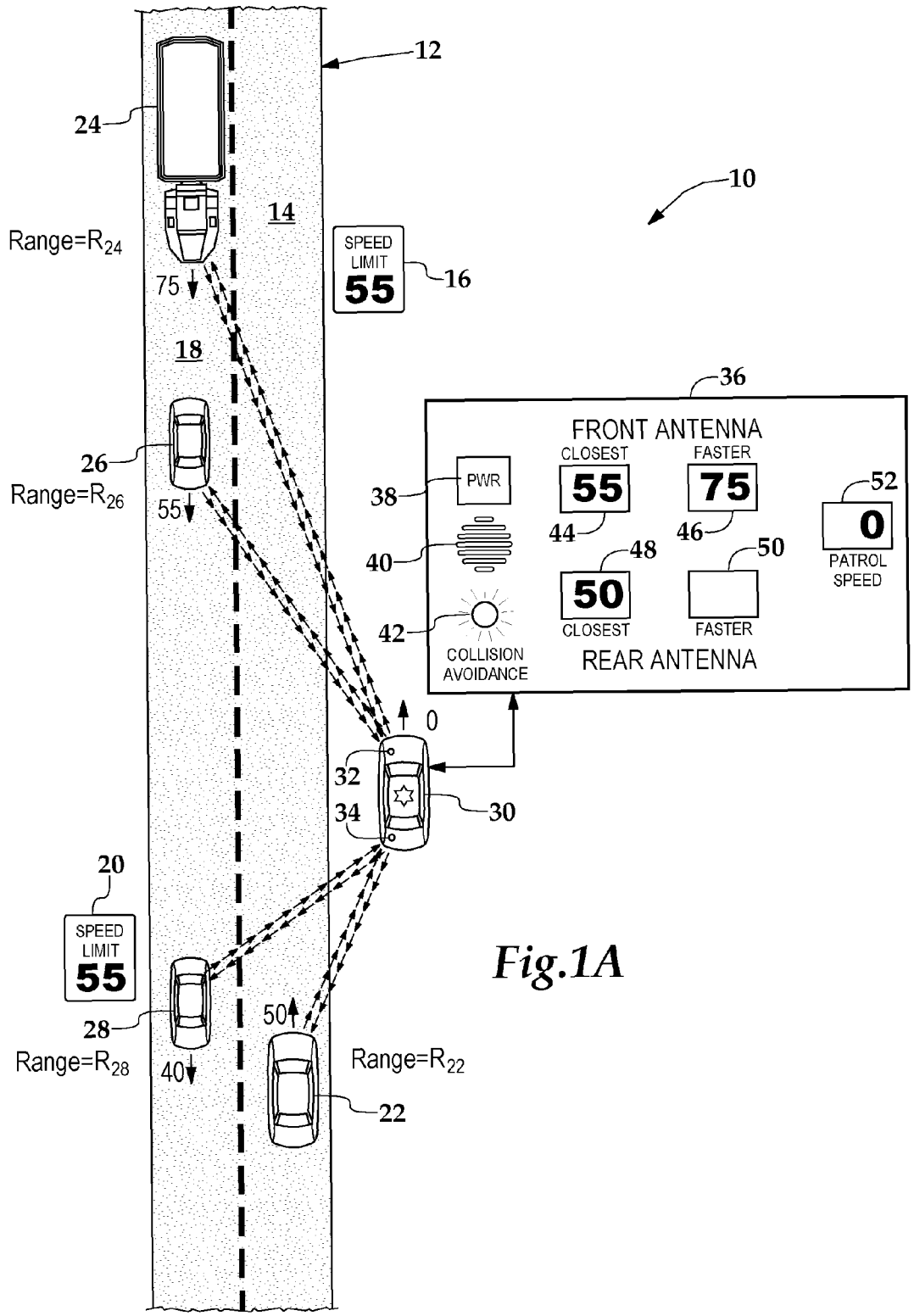
FIG. 1A depicts a schematic illustration of a multiple vehicle environment wherein one embodiment of a system for traffic surveillance is being utilized.

Referring initially to FIG. 1A, therein is depicted an environment 10 having multiple vehicles wherein one embodiment of the vehicular traffic surveillance Doppler radar system is being utilized. A highway 12 includes a northbound lane 14 having a speed limit of 55 mph as depicted by speed limit sign 16 and a southbound lane 18 having a speed limit of 55 mph as depicted by speed limit sign 20. A vehicle is traveling in the northbound lane 14 at a speed of 50 mph as indicated by the northbound arrow and number "50" proximate to the front portion of the vehicle 22. Vehicles 24, 26, and are traveling in the southbound lane 18 at speeds of 75 mph, 55 mph, and 40 mph, respectively. A patrol vehicle 30 equipped with a vehicular traffic surveillance Doppler radar system is stationary and facing north in a location that is proximate to the northbound lane 14. The vehicle 22 is approaching the patrol vehicle 30 quickly. Additionally, with respect to the position of patrol vehicle 30, vehicles 24 and 26 are positioned such that conditions are present for look-past error.

A front-facing antenna 32 and a rear-facing antenna are mounted on the patrol vehicle 30 for surveying traffic. A control panel 36 is associated with the patrol vehicle 30 and preferably secured to the dashboard in the interior of the patrol vehicle 30. The control panel 36 includes a power button 38, a speaker 40, and a collision avoidance indicator 42. Displays 44 and 46 indicate the speeds (in mph) of the closest vehicle and the faster vehicle, respectively, associated with the front-facing antenna 32. Similarly, displays 48 and 50 indicate the speeds (in mph) of the closest vehicle and the faster vehicle, respectively, associated with the rear-facing antenna 34. In instances where only one vehicle is associated with the rear-facing antenna 34, the display 50 is empty. A display 52 indicates the speed (in mph) of the patrol vehicle 30. It should be appreciated that the displays 44-52 may either be dedicated to displaying the indicators discussed hereinabove or configurable to provide other types of indications. For example, a display may be configured to provide a history of the speed of a particular targeted vehicle.

As illustrated, the patrol vehicle 30 is monitoring the traffic in both the northbound lane 14 and southbound lane 18. With regard to both antennas 32 and 34, the vehicular traffic surveillance Doppler radar system is in a stationary, closest and faster, approaching only mode. In this mode, the police vehicle 30 is stationary and monitoring the speeds of both the closest and faster vehicles approaching the police vehicle 30. It should be appreciated, however, that other modes of operation are within the teachings of the present invention. By way of example, the following table provides a non-exhaustive matrix of the more common operator selectable modes of the multi-mode radar system disclosed herein.

TABLE I

Common Operator Selectable Modes

| Patrol Vehicle | Type of Signal(s) | Receding/Approaching |
| --- | --- | --- |
| Stationary | Closest and Faster | Approaching |
| Stationary | Closest and Faster | Receding or Approaching |
| Stationary | Closest and Faster | Receding |
| Stationary | Closest | Approaching |
| Stationary | Closest | Receding or Approaching |
| Stationary | Closest | Receding |
| Moving | Closest and Faster | Approaching |
| Moving | Closest and Faster | Receding or Approaching |
| Moving | Closest and Faster | Receding |
| Moving | Closest | Approaching |
| Moving | Closest | Receding or Approaching |
| Moving | Closest | Receding |

With respect to the forward-facing antenna 32, the officer operating the vehicular traffic surveillance Doppler radar system is intending to target vehicle 26 which is a small sports car having a relatively small radar cross-section ($\sigma_1$). The forward-facing antenna 32 emits double-modulated FM signals that spread less than ten degrees from an axis of the forward-facing antenna 32. It should be appreciated that although the present invention is described as utilizing double-modulated FM signals, other types of modulated FM signals may be utilized. For example, triple and higher order modulated FM signals may be utilized. In one embodiment, the double-modulated FM signals are a continuous wave signal transmission that is alternated between a first and second frequency, which may be expressed as $f_1$ and $f_2$, respectively. The double-modulated FM signals reflect off of the vehicle 26 and the vehicle 24 which is a large truck having a relatively large radar cross-section ($\sigma_2$), wherein $\sigma_2 \gg \sigma_1$. Hence, the vehicle 24 has a stronger reflected signal than the vehicle 26 even though the vehicle 24 is farther away from the patrol vehicle 30 than the vehicle 26. The reflected double-modulated FM signals generated by the vehicles 24 and 26 are received by the forward-facing antenna 32 and processed to resolve the multiple targets by determining the direction, speed, and range of the targeted vehicles 24 and 26.

As will be discussed in further detail hereinbelow, the vehicular traffic surveillance Doppler radar system receives the reflected double-modulated FM signals and performs a quadrature demodulation on the reflected double-modulated FM signals. In one embodiment, homodyne reception is utilized wherein a voltage having the original carrier frequency is generated and combined with the incoming reflected double-modulated FM signals. The quadrature demodulated, reflected FM signals are then converted to digital signals and a fast Fourier transform (FFT) is performed that results in an approaching or closing target spectrum and a receding or opening target spectrum. In one implementation, a complex FFT is performed on the data. Analysis of the resulting spectra using the multi-direction sensing capabilities of the instant police radar indicates that both of the vehicles 24 and 26 are approaching. The frequency signal differentials associated with each target are also analyzed to determine that the vehicle 24 is traveling at 75 mph and the vehicle 26 is traveling at 55 mph. The phase angle signal differentials associated with each of the targets are analyzed to determine that the vehicle 24 is at a range of $R_{24}$ and that the vehicle 26 is at a range of $R_{26}$. As $R_{26} \ll R_{24}$, the vehicle 26 is closer to the patrol vehicle 30 than the vehicle 24. The speed of the closest vehicle, i.e., vehicle 26, is indicated at the display 44 and the speed of the faster vehicle, i.e., vehicle 24, is indicated at display 46.

The police officer operating the vehicular traffic surveillance Doppler radar system uses the displayed information to determine that the closest target, which is vehicle 26, is traveling at 55 mph and a more distant target, which is vehicle 24, is traveling at 75 mph. Existing radar systems assume that the strongest target is the closest target; namely, the vehicle 26 in the illustrated example. Accordingly, if patrol vehicle 30 had been equipped with an existing radar system, then the vehicle 26 could have appeared to have been traveling 75 mph in a 55 mph zone. The vehicular traffic surveillance Doppler radar system presented herein avoids this false positive due to lookpast error by calculating target ranges based upon the phase angle signal differentials associated with the targets rather than assuming signal strength is indicative of range and, in particular, the strongest signal is from the closest vehicle.

With respect to the rear-facing antenna 34, the officer operating the vehicular traffic surveillance Doppler radar system is intending to target vehicle 22. The emitted double-modulated FM signals reflect from the vehicle 22 and the vehicle 28 which is heading south in the southbound lane 18. The reflected double-modulated FM signals are processed to determine the direction, speed, and range of the targets. The vehicle 28 is receding from the patrol vehicle 30, so the speed and range of the vehicle 28 are ignored since the vehicular traffic surveillance Doppler radar system is in an approaching only mode. The speed, 50 mph, and range, 300 ft, of the vehicle 22 are determined and the display 48 indicates that the closest vehicle is traveling at 50 mph. The police officer uses the displayed information to determine that vehicle 22 is traveling at 50 mph.

Further, the vehicular traffic surveillance Doppler radar system includes safety features that determine if conditions are safe for the patrol vehicle 30 to pull-out in front of oncoming traffic based on the speed and range of the oncoming vehicles. Based on the speed (50 mph) and the range (300 ft) of the vehicle 22, the vehicular traffic surveillance Doppler radar system determines that conditions are hazardous and a collision with vehicle 22 is possible if the patrol vehicle 30 pulls into the northbound lane 14. In one implementation, to indicate that conditions are hazardous and a collision is possible, the vehicular traffic surveillance Doppler radar system provides a visual indication via collision avoidance indicator 42 and an audio indication via speaker 40 to the police officer operating the vehicular traffic surveillance Doppler radar system. In one embodiment, the visual collision avoidance indicator 42 and the audio indication via speaker 40 are only enabled when the patrol vehicle 30 is in motion. In another embodiment, the operator of the patrol vehicle 30 may turn the collision avoidance system OFF and ON as the system is needed.

Figure 1B:
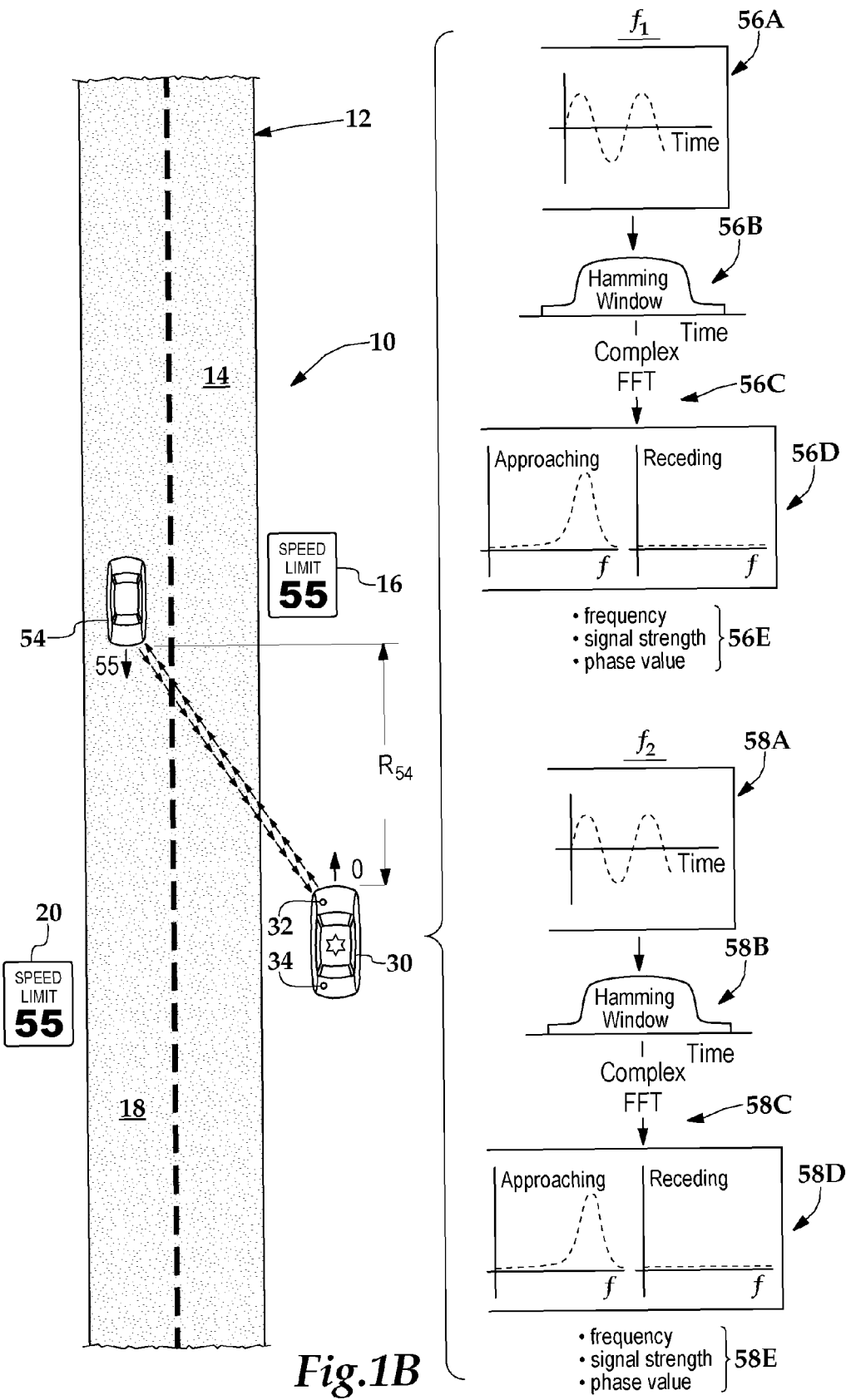
FIG. 1B depicts a schematic illustration of a single vehicle environment wherein one embodiment of a system for determining a range of a target is being utilized.

FIG. 1B depicts the environment 10 of FIG. 1A wherein one embodiment of a system for determining the range of a target vehicle is being utilized. As illustrated, the patrol vehicle 30 is monitoring a vehicle 54 traveling at a speed of 55 mph in the southbound lane 18. Forward-facing antenna 32 transmits a continuous FM signal to the vehicle 54 and receives a reflected double-modulated signal therefrom. The frequency signal differentials associated with the signals are analyzed to determine that the vehicle is traveling at 55 mph. In particular, when the double-modulated FM signal is reflected from the vehicle 54, the frequency of the reflected double-modulated FM signal is shifted in proportion to a component of the velocity of the vehicle 54. The shift or frequency signal differential between the double-modulated FM signal and the reflected double-modulated FM signal provides the speed of vehicle 54. In instances where triple or higher order modulated FM signals are utilized, mathematical "fold overs" are used to remove phase ambiguities and distinguish between short and long range targets so that target metrics such as speed, heading, and range can be determined.

Further, the phase angle signal differentials associated with the reflected double-modulated signal are analyzed to determine that the vehicle 54 is at a range of $R_{54}$ from the patrol vehicle 30. More specifically, the range, $R_{54}$, is related to the change or differential in phase, $\Delta_{phase}$, in the reflected double-modulated signal by the following range equation:

$$R_{54} = (\Delta_{phase} * C)/(4\pi(f_2 - f_1)), \text{ where}$$

$\Delta_{phase} = \phi_2 - \phi_1$ for the phase angle signals ($\phi$) in first and second sets of data (phase angle may be expressed in radians);

$f_1$ and $f_2$ are the frequencies utilized in the double-modulated signal (frequency may be expressed in gHz); and c is the speed of light (186,282 miles/second).

Utilizing the relationships described by the range equation, the traffic surveillance Doppler radar system determines the phase magnitude between the phase angle signals ($\phi$) to arrive at a target range. For example, if the change in phase, $\Delta_{phase}$, of the received reflected double-modulated signal is +/−180° and $f_1$=34.7 gHz and $f_2$=34.7001 gHz, then the range, $R_{54}$, of the vehicle 54 is 2,460 ft (0.47 miles). In multi-vehicle environments, such as the environment described in FIG. 1A, by calculating the range of each vehicle in the multi-vehicle environment, the Doppler radar system described herein is able to determine which vehicle is the closest or which vehicle is closer. Additionally, the range of the target may be utilized in conjunction with the speed and the heading of the target to determine the risk of a collision between the target and a patrol vehicle.

More specifically, to determine the range, speed, and heading of the target vehicle, for example, the Doppler radar system sets the modulation state to frequency $f_1$ and a processor, such as a digital signal processor (DSP), within the Doppler radar system acquires a full buffer of data 56A for each of two quadrature demodulated channels. Once the buffer is full, a Hamming window 56B or other discrete Fourier transform (DFT) window is applied to both channels of data. A complex FFT 56C is performed and two spectra 56D of Fourier components are outputted, i.e., one for the approaching targets and one for the receding targets. Targets that are heading towards the Doppler radar are located in the approaching spectra and targets that are heading away from the Doppler radar are located in the receding spectra. The spectra 56D are searched for the strongest target signals and data 56E, such as frequency, signal strength, and phase angle value ($\phi_1$), is stored for each target signal. For example, with respect to the vehicle 54, the approaching portion of spectra 56D is searched and frequency and phase value measurements are stored.

In one embodiment, at the end of the collection of the first buffer of data 56A and during the processing depicted by numerals 56B through 56E, the modulation state is set to frequency $f_2$ and a second buffer of data 58A is collected before a sequence of data processing operations 58B through 58E are executed which are analogous to the processing operations 56B through 56E. In particular, the phase angle value ($\phi_2$) for the second set of data is collected. Once the data 58E is collected, the phase angle values ($\phi_1$ and $\phi_2$) for the target signals in spectra 56D and 58D that correspond to the vehicle 54 are compared and the change in phase angle, $\Delta_{phase}$, is utilized to calculate the range of the vehicle 54 as described by the range equation presented hereinabove. Additionally, to determine the speed of the vehicle 54, the frequency of the $f_1$ or $f_2$ signal is measured since the change in frequency is proportional to a component of the velocity of the target vehicle. It should be appreciated that the speed and the range of the vehicle may be calculated in any order or simultaneously.

Figure 2:
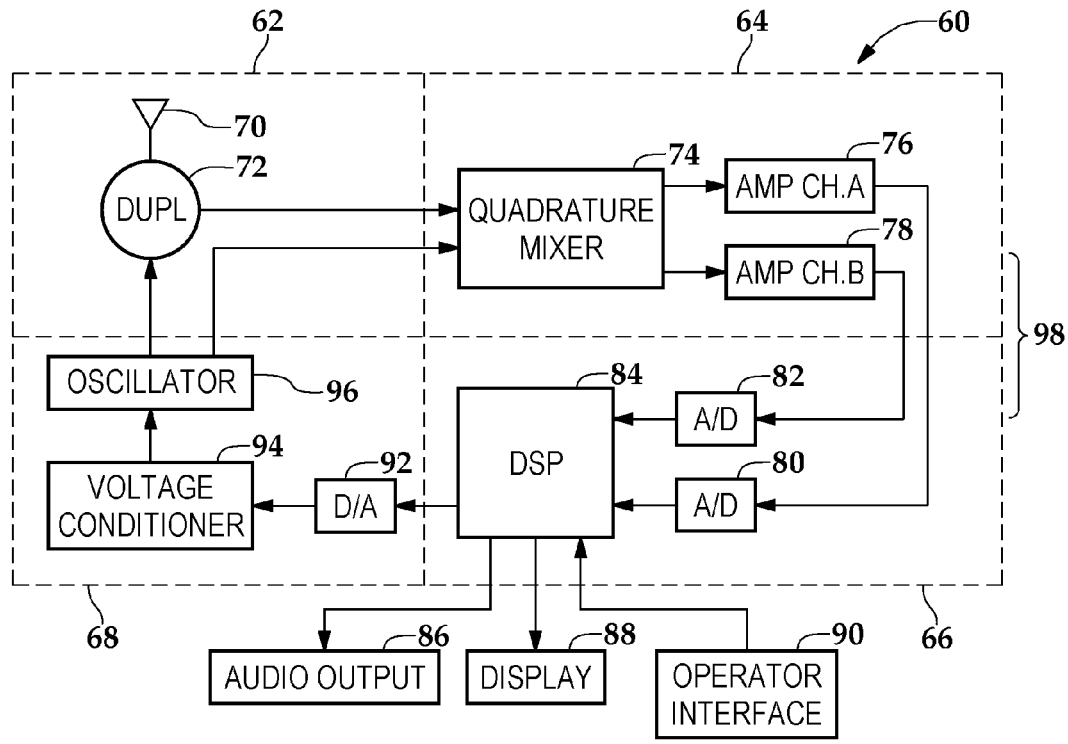
FIG. 2 depicts a schematic diagram of one embodiment of the vehicular traffic surveillance Doppler radar system.

FIG. 2 depicts one embodiment of the vehicular traffic surveillance Doppler radar system which is generally designated 60. The vehicular traffic surveillance Doppler radar system includes an antenna circuit portion 62, a quadrature circuit portion 64, a processing circuit portion 66, and a modulation circuit portion 68. The antenna circuit portion 62 includes an antenna 70 that transmits outgoing radar waves in the form of double-modulated FM signals and receives reflected double-modulated FM signals from stationary and moving objects including intended and unintended target vehicles. A duplexer 72 guides the outgoing double-modulated FM signals from the modulation circuit portion 68 to antenna 70 and guides reflected radar waves received by antenna 70 to the quadrature circuit portion 64.

The quadrature circuit portion 64 includes a quadrature mixer 74 coupled to the duplexer 72 in order to receive the reflected double-modulated FM signals. The quadrature circuit portion 64 is also coupled to the modulation circuit portion 68 in order to receive a local oscillator signal. As will be explained in further detail in FIG. 3, the quadrature mixer 74 performs a quadrature demodulation by mixing the local oscillator signal with incoming RF of reflected radar waves in two separate mixers in two separate channels such that one channel is shifted by 90° relative to the other channel. The quadrature demodulation results in a channel A signal that is driven to amplifier 76 and a channel B signal that is driven to amplifier 78.

Preferably, amplifiers 76 and 78 are matched, low noise amplifiers. The amplified channel A and B signals are driven to the processing circuit portion 66 and received by analog-to-digital (A/D) converters 80 and 82, respectively. The A/D converters 80 and 82 sample the analog signals from amplifiers 76 and 78, respectively, and output the sampled signals as digital data sampled signals on one or more transmission paths, such as busses, infrared (IR) communication paths, or cables, connected to a DSP 84.

The DSP 84 processes the digital data samples from channels A and B by performing a FFT thereon to develop the aforementioned approaching target Fourier spectrum and receding target Fourier spectrum. The target Fourier spectra are searched for targets and the direction each target is traveling relative to the patrol vehicle is identified. Data associated with the spectra is further analyzed to determine the speeds of the identified targets based upon frequency signal differentials associated with the targets. Additional information regarding the direction and speed sensing capabilities of the radar system of the present invention may be found in the following co-owed United States patents: (1) U.S. Pat. No. 6,198,427, entitled "Doppler Complex FFT Police Radar With Direction Sensing Capability," issued on Mar. 6, 2001 in the names of Aker et al.; and (2) U.S. Pat. No. 6,646,591, entitled "Doppler Complex FFT Police Radar With Direction Sensing Capability," issued on Nov. 22, 2003 in the names of Aker et al.; both of which are hereby incorporated by reference for all purposes.

As previously discussed, the range of the identified target is calculated based upon a phase angle signal differential associated with the target. In particular, the ranging circuit portion 98, which in one embodiment includes the quadrature circuit portion 64 and the processing circuit portion 66, determines the heading of the target as well as the range of the target. In one implementation, heading or direction is determined by comparing the phases or lead/lad relationship of two frequencies. For example, a target at 1000 ft. might lead by 70 degrees if closing and lag by 70 degrees if opening. With respect to the range of the target, in regard to a particular target, the phase angle is arbitrary. However, the difference between the phase angle for the particular target with respect to a first set of data and the phase angle for the particular target with respect to a second set of data is indicative of the range between the police Doppler radar of the present invention and the particular target. Accordingly, the vehicular surveillance Doppler radar system described herein permits target discrimination between any two targets including two targets of the same speed traveling in opposite directions.

Target metrics, such as direction or heading, speed, and range, determined by the DSP 84 are provided to the operator via an audio output 86 and a display 88, which, in one implementation, may be control unit 36 of FIG. 1. An operator interface 90, which may include front panel or remote controls, provides for general operation of the system including operator selectability of the aforementioned multiple modes of operation. It should be appreciated that the range measurements may be presented in a comparative fashion where one vehicle is indicated to be closer or the closest relative to one or more other vehicles.

A D/A convertor 92 receives multiple digital signals from the DSP 84 and converts these signals to a voltage which is supplied to a voltage conditioner 94 which may be a voltage regulator or varactor device, for example. Operating in combination with the converter 92, the voltage conditioner 94 provides two voltages to an oscillator 96 that, in turn, generates the double-modulated FM signals. In particular, a frequency versus voltage characteristic that is associated with the oscillator 96 is utilized to generate two frequencies with only a relatively small difference in the applied voltages. In one embodiment, the DSP 84 determines the required calibration and generates a calibration signal indicative of the voltages required to generate the desired frequencies. The calibration signal is received by the D/A converter 92, which in combination with the voltage conditioner 94, applies the two voltages to the oscillator 96 that generate the desired double-modulated frequency.

Further information regarding the target range self-calibrating capabilities of the radar system of the present invention may be found in the following commonly owned, co-pending patent application: "System and Method for Calibrating a Vehicular Traffic Surveillance Doppler Radar," filed on Feb. 16, 2005, assigned application Ser. No. 11/059,474, and issued on Jun. 6, 2006 as U.S. Pat. No. 7,057,550 in the name of John L. Aker; which is hereby incorporated by reference for all purposes.

In one implementation, the oscillator 96 comprises a dielectric resonator oscillator (DRO) or a Gunn diode oscillator that utilizes a negative resistance property of bulk gallium arsenide (GaAs) to convert an applied DC voltage into microwave power. Further information regarding the modulation circuit portion 68 may be found in the following commonly owned, co-pending patent application: "Modulation Circuit for a Vehicular Traffic Surveillance Doppler Radar System," filed on Feb. 16, 2005, assigned application Ser. No. 11/059,199, and issued on May 23, 2006 as U.S. Pat. No. 7,049,999 in the name of John L. Aker; which is hereby incorporated by reference for all purposes.

It should be appreciated by those skilled in the art that although a particular arrangement of circuitry has been illustrated with respect to the radar system of the present invention, the radar system of the present invention may comprise any combination of hardware, software, and firmware. In particular, each of the circuit portions 62, 64, 66, and 68 of the present invention may comprise any combination of hardware, software, and firmware.

Figure 3:
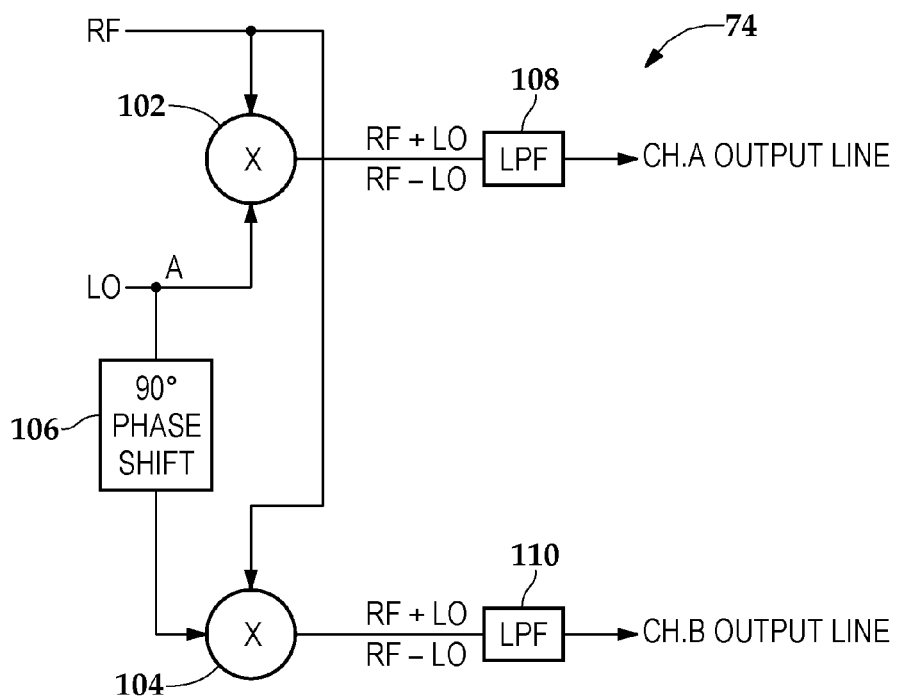
FIG. 3 depicts a schematic diagram of one embodiment of a quadrature mixer for the vehicular traffic surveillance Doppler radar system.

FIG. 3 depicts one embodiment of the quadrature mixer 74. As previously discussed, the function of the quadrature mixer 74 is to mix local oscillator energy with incoming RF of reflected radar waves in two separate mixers in two separate channels and shift one channel 90° relative to the other channel. Incoming RF from the duplexer 72 is provided to a channel A mixer 102 and a channel B mixer 104. Local oscillator (LO) energy arrives from oscillator 96 and is provided as a second input to mixer 102. The local oscillator energy is also coupled to a second input of mixer 104 via a phase shifter 106 which, in the illustrated embodiment, is a 90° phase shifter. The phase shifter 106 shifts the local oscillator signal by 90°, or any integer multiple of 90°, in either direction relative to the local oscillator signal. In an alternative embodiment, instead of shifting the local oscillator signal by 90°, the incoming RF can be shifted by 90° at the input of one mixer relative to the same incoming RF at the input of the other mixer.

The 90° phase shift can be achieved in any known manner associated with quadrature demodulation. In the preferred embodiment, the 90° phase shift is achieved by having a microwave transmission line which is one-quarter wavelength (at the frequency of operation) longer in the path from the local oscillator or RF input to one mixer than it is in the path to the other mixer. By way of example, other techniques such as reactive circuits or delay lines may also be used.

The mixers 102 and 104 modulate the local oscillator signals with the Doppler shifted RF signals reflected from stationary and moving objects and output sum and difference frequencies on a channel A output line and a channel B output line. Low pass filters 108 and 110 are coupled to the channel A and B output lines, respectively, in order to remove the upper sideband (local oscillator plus Doppler shifted RF) signals from each of the spectrum on the channel A and B output lines so that only the difference frequencies are outputted. Preferably, to reduce errors and noise, the mixers 102 and 104 and low pass filters 108 and 110 are matched as closely as possible since amplitude variations between channels A and B may cause noise in the system.

Figure 4:
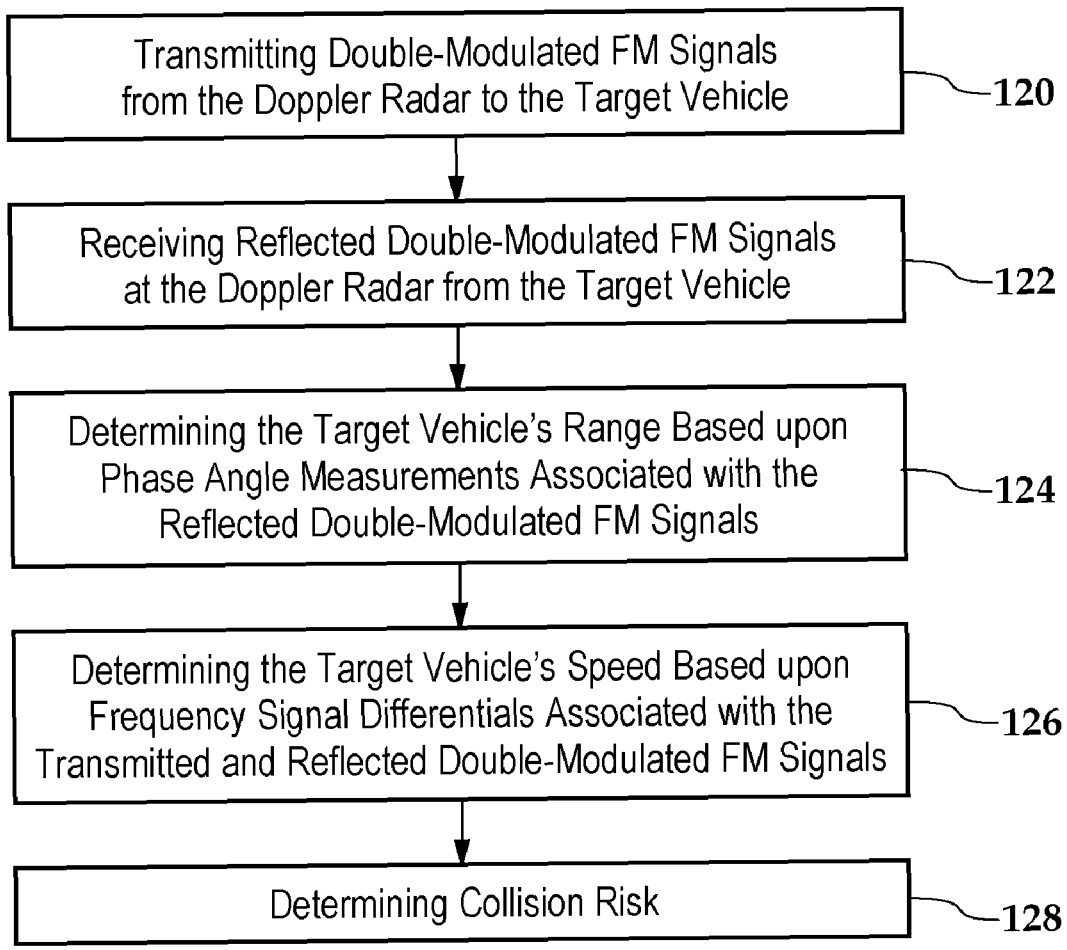
FIG. 4 depicts a flow chart of one embodiment of a method for determining a range of a target and avoiding a collision.

FIG. 4 depicts one embodiment of a method for avoiding collisions between a source vehicle, such as a law enforcement cruiser or motorcycle, having a Doppler radar associated therewith and a target vehicle. At block 120, double-modulated FM signals are transmitted from the Doppler radar to the target vehicle. The double-modulated signals may be the aforementioned double-modulated $f_1$ and $f_2$ FM signals. At block 122, the Doppler radar receives reflected double-modulated FM signals from the target vehicle. At block 124, the target vehicle's range is determined based upon phase angle measurements associated with the reflected double-modulated FM signals. As part of determining the range, a quadrature demodulation may be performed on the reflected double-modulated FM signals. At block 126, the target vehicle's speed is determined based upon frequency signal differentials associated with the transmitted and reflected double-modulated FM signals. It should be appreciated that the operations presented in blocks 124 and 126 may be performed simultaneously or in another order such as reverse order. At this time, the heading or direction of the target vehicle with respect to the source vehicle may also be determined. At block 128, the risk of collision between the source vehicle and the target vehicle is determined. The risk of collision is related to several variables including the speed of the source vehicle and the speed, heading, and range of the target vehicle. For example, if the source vehicle, i.e., patrol vehicle, is stationary and the target vehicle is approaching at 50 mph at a range of 300 feet then the target vehicle will be passing the patrol vehicle in approximately 4 seconds. Hence, the patrol vehicle does not have enough time to merge into the approaching or oncoming traffic and the Doppler radar notifies the operator that a risk of collision is present. It should be appreciated that the time threshold for safe merger/risk of collision is adjustable. For example, the time threshold may be set for 10 seconds. Further, the time threshold may be adjusted in accordance with the time of day, road conditions, and weather, for example.

Figure 5A:
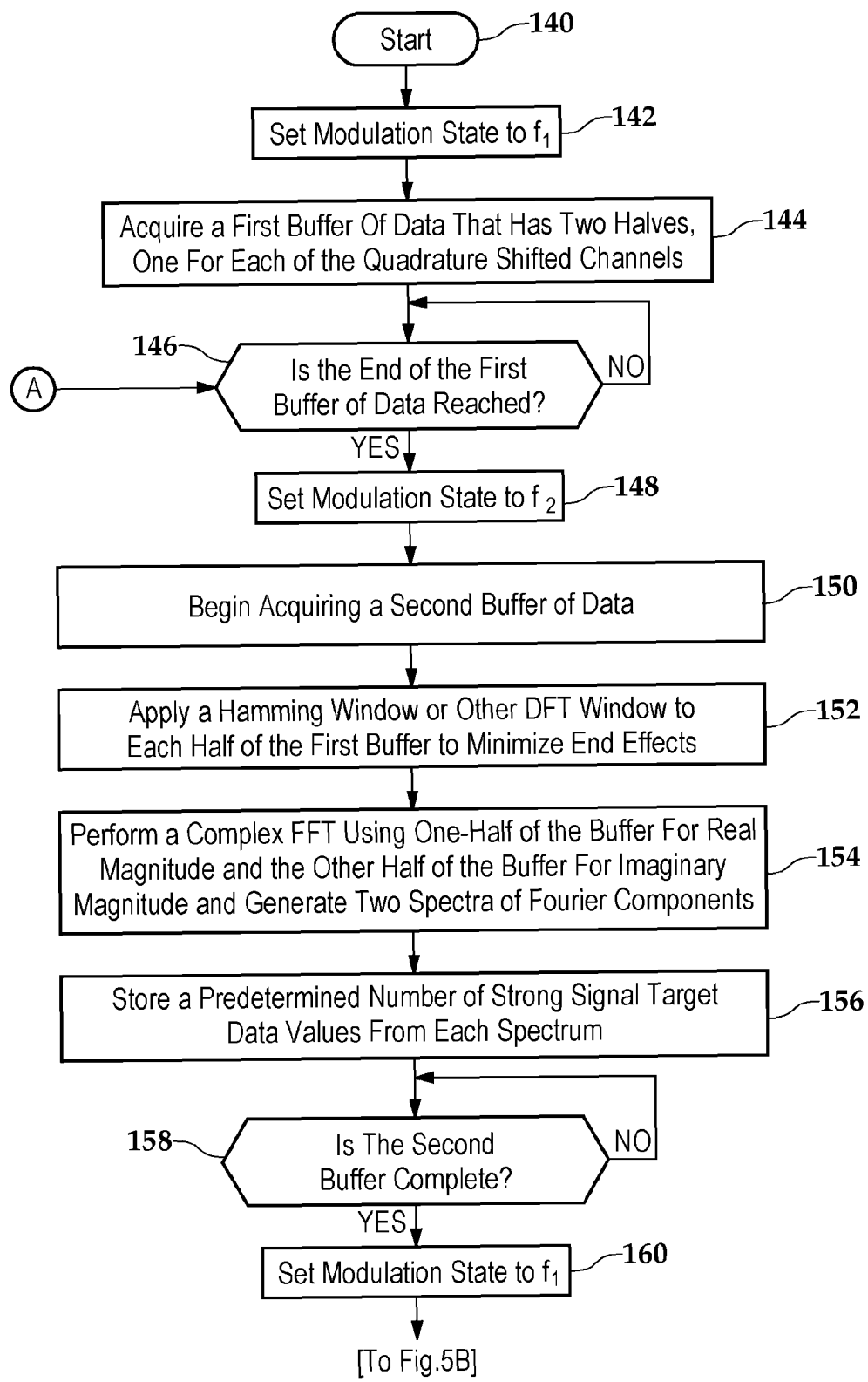
FIGS. 5A and 5B together depict a flow chart of another embodiment of a method for determining a range of a target.
Figure 5B:
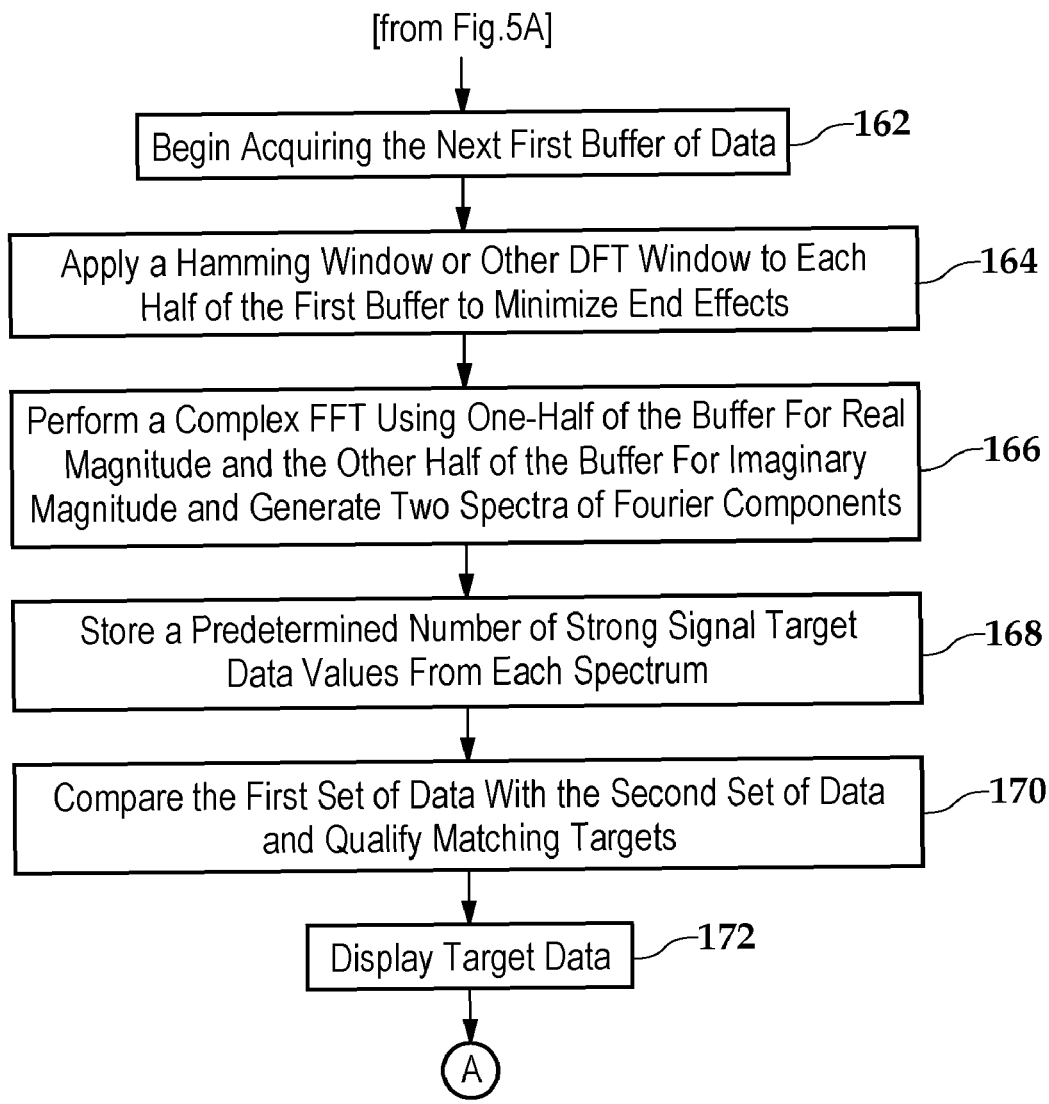

FIGS. 5A and 5B together depict another embodiment of a method for determining a range of a target. At block 140, the Doppler radar is operating in a stationary patrol vehicle, closest target, receding or approaching only mode that is implemented utilizing a relative distance measurement process. At block 142, the modulation state is set to frequency $f_1$. At block 144, a first buffer of data is acquired that has two halves; namely, one for each of the quadrature shifted channels. At waiting block 146, once the end of the first buffer of data is reached, the methodology advances to block 148 wherein the modulation state is set to frequency $f_2$.

At block 150, the second buffer of data is collected. While this second buffer of data is being collected, the methodology continues to block 152 where a Hamming window or other DFT window is applied to each half of the first buffer of data in order to minimize end effects. At block 154, a complex FFT is performed utilizing one-half of the buffer as the real magnitude and utilizing the other half buffer as the imaginary magnitude. This generates two spectra of Fourier components; namely, one spectra for approaching targets and one spectra for receding targets. These two spectra are searched at block 156 in order to find and store a predetermined number of strong signal target data values and relevant parameters such as frequency, signal strength, and phase value for each target signal.

At waiting block 158, the methodology waits until the second buffer of data is acquired before advancing to block 160 where the modulation state is returned to frequency $f_1$ and the next first buffer of data is acquired at block 162. At blocks 164 through 168, while the data of the first buffer is being collected, the data of the second buffer is analyzed. Briefly, similar to the operations of blocks 152 through 156, at block 164, the end effects of the data are minimized. At block 166, a complex FFT is performed and at block 168, a predetermined number of strong signal target data values from each spectrum are recorded. At block 170, the first set of data recorded at block 156 and the second set of data recorded at block 168 are analyzed to determine various target metrics such as the direction, speed, and range of each target. At block 172, based on the settings the operator has selected, appropriate target data is displayed. For example, the speed of an approaching target may be displayed in miles per hour. The methodology then returns to decision block 146 as indicated by the letter A.

Figure 6A:
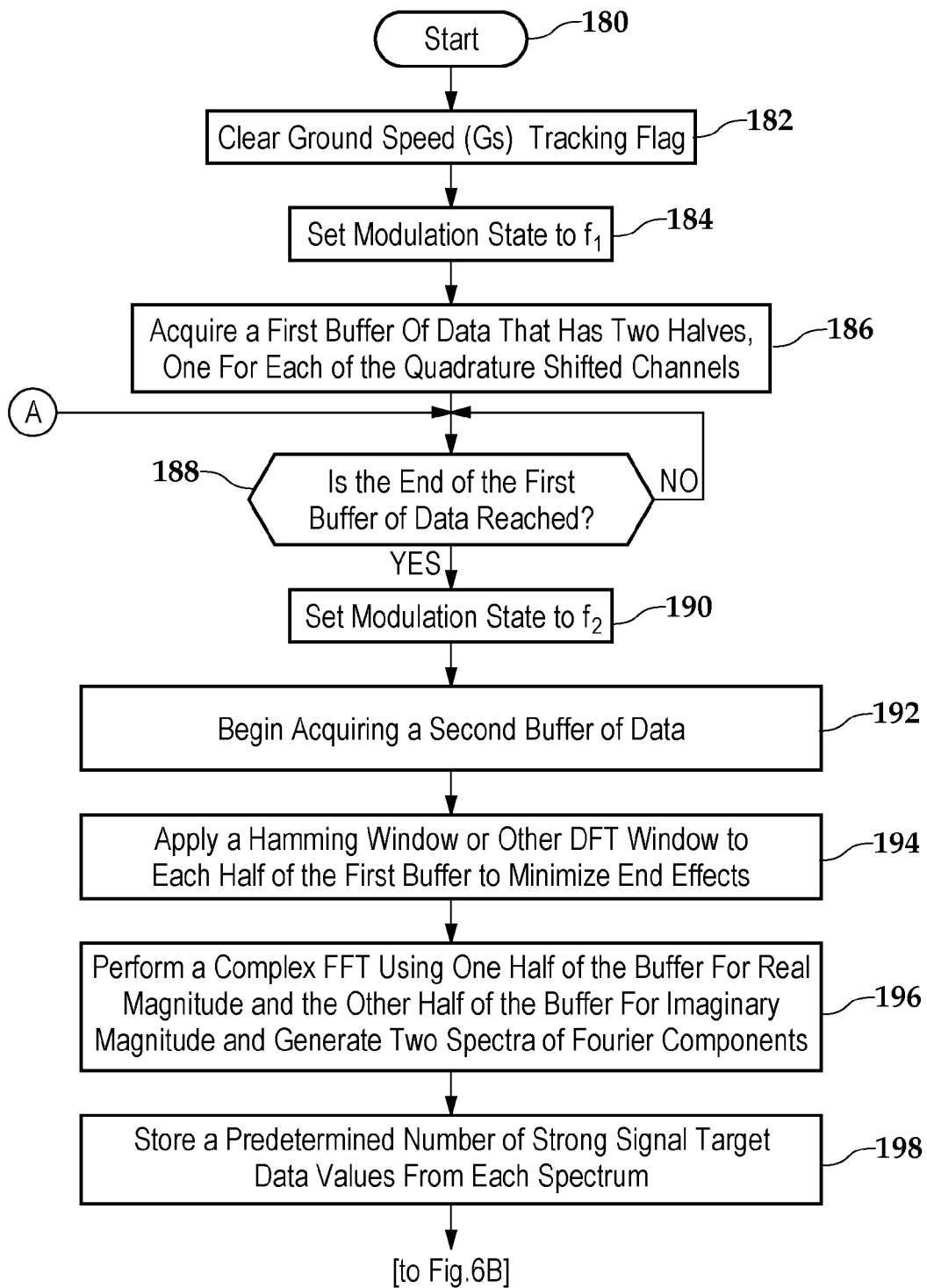
FIGS. 6A, 6B, and 6C together depict a flow chart of a further embodiment of a method for determining a range of a target.
Figure 6B:
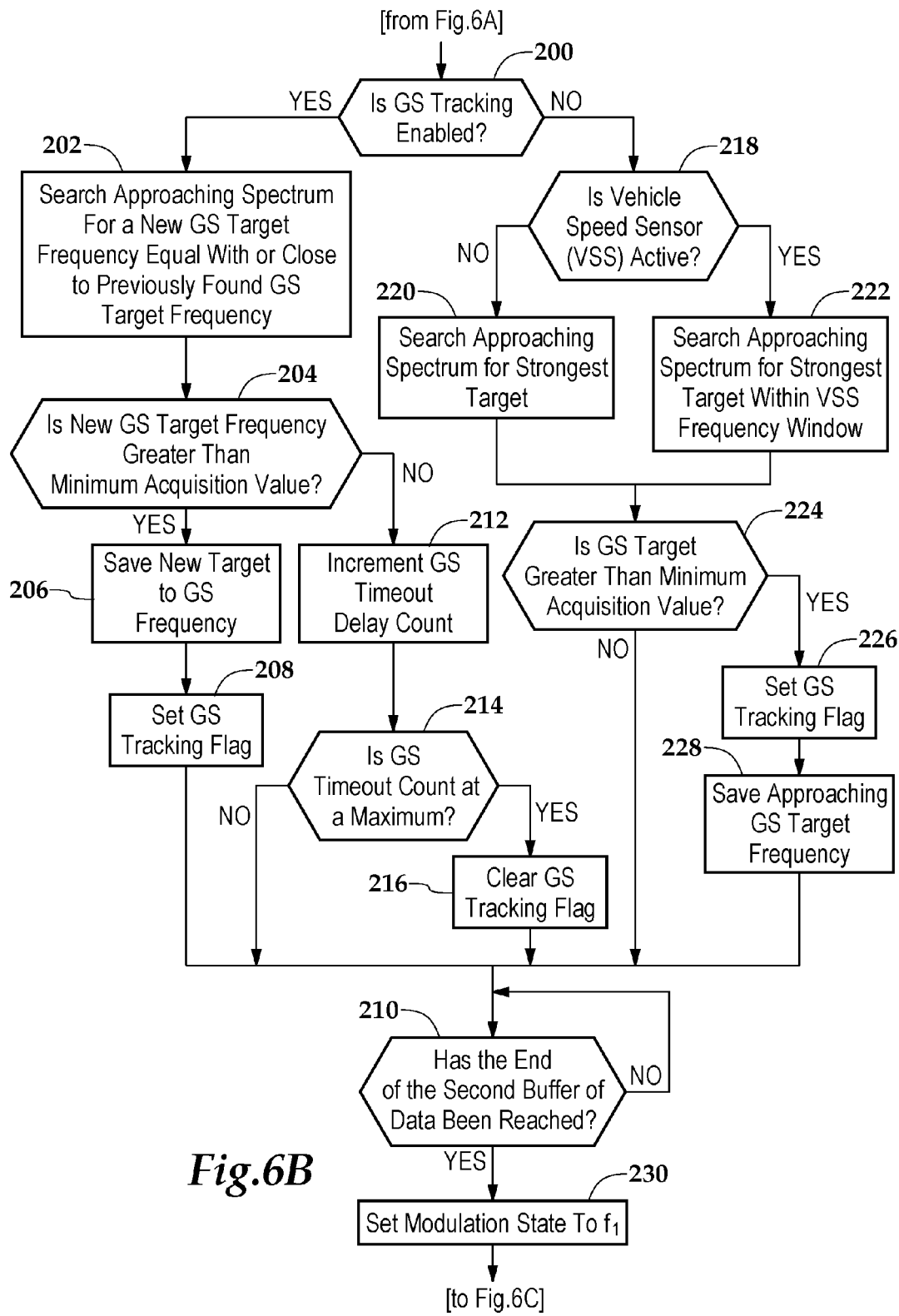
Figure 6C:
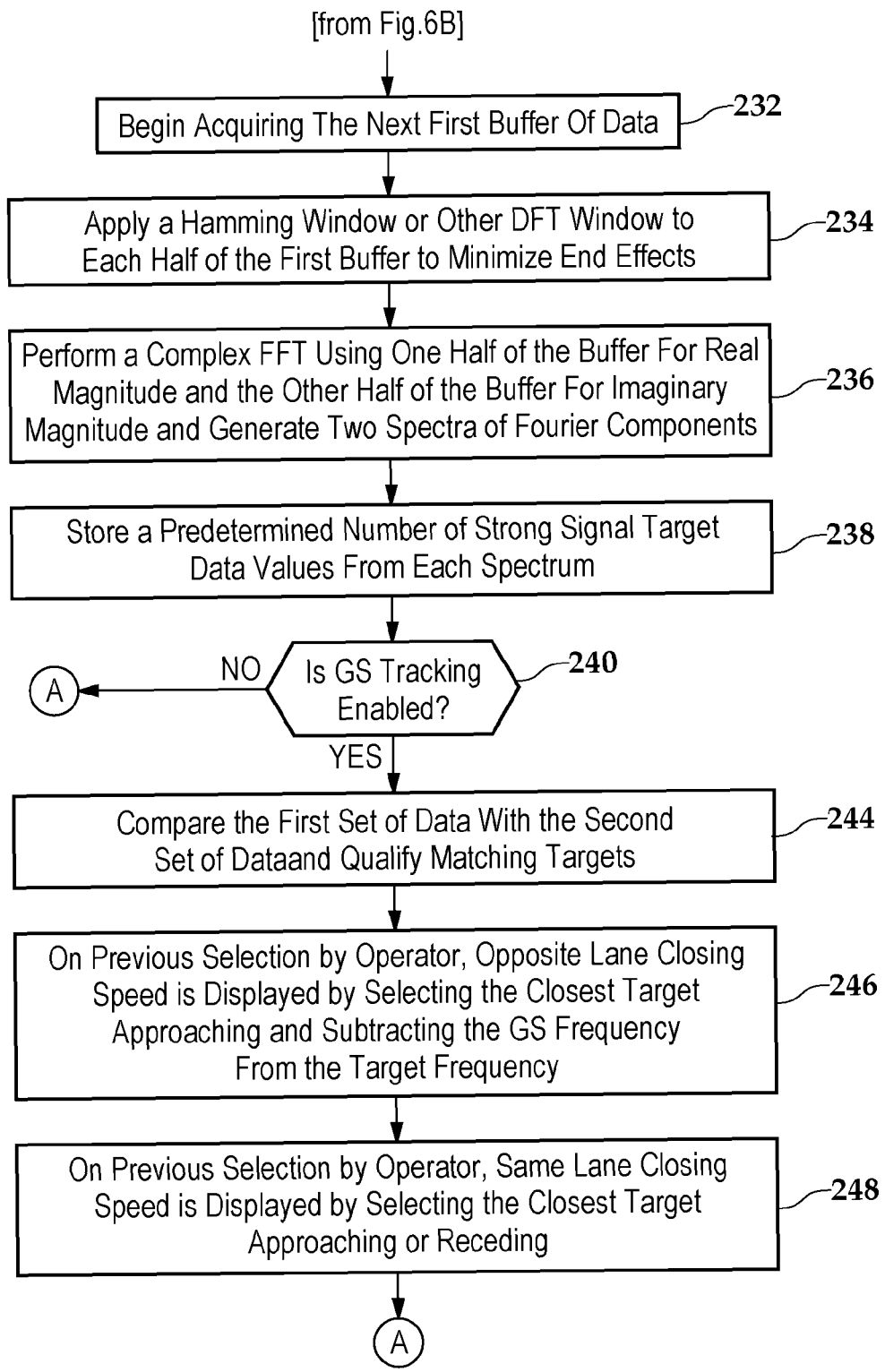

FIGS. 6A, 6B, and 6C together depict a further embodiment of a method for determining a range of a target. At block 180, the Doppler radar system is operating in a moving patrol vehicle, closest target, receding or approaching mode that is implemented utilizing a relative distance measurement process. At block 182, the ground speed tracking flag is cleared. At block 184, the modulation state is set to frequency $f_1$. At block 186, a first buffer of data is acquired and once the end of the first buffer is reached, at block 188, the methodology advances to block 190 where the modulation state is set to frequency $f_2$. At block 192, a second buffer of data is collected. While the second buffer of data is being collected, the first buffer of data is processed and analyzed in blocks 194 through 198. At block 194, a Hamming window or other DFT window is applied to each half of the first buffer of data in order to minimize end effects. At block 196, a complex FFT is performed utilizing one-half of the buffer as the real magnitude and utilizing the other half buffer as the imaginary magnitude. This generates approaching and receding spectra of Fourier components. These two spectra are searched at block 198 in order to find and store a predetermined number of strong signal target data values and relevant parameters such as frequency, signal strength, and phase value for each target signal.

In one embodiment, the ground speed of the patrol vehicle is required in order to accurately determine the speed of a target vehicle. At decision block 200, if ground speed tracking is enabled, then the methodology advances to block 202 wherein the approaching spectrum is searched for a new ground speed target frequency that is equal with or close to the previously found ground speed target frequency. At decision block 204, if the new ground speed target frequency is greater than the minimum acquisition value, then a new target to ground speed frequency is saved at block 206. At block 208, the ground speed tracking flag is set. At block 210, the methodology waits for the second buffer of data to be completed.

Returning to decision block 204, if the new ground speed target frequency is not greater than the minimum acquisition value, then the methodology advances to block 212 wherein the ground speed timeout delay count is incremented. At block 214, if the ground speed timeout count is at a maximum, then the process advances to block 216 where the ground speed tracking flag is cleared before advancing to block 210. Otherwise, the process continues directly from block 214 to block 210.

Returning to decision block 200, if the ground speed tracking is not enabled, then the methodology advances to blocks 218 through 228 in order to determine the ground speed of the patrol vehicle and activate ground speed tracking. In one embodiment, a target that represents the background radar signal is found as a representation of the ground speed of the patrol vehicle. At decision block 218, if the vehicle speed sensor is not active, then the approaching spectrum is searched for the strongest target at block 220. The vehicle speed sensor may be a digital output from the patrol car speedometer, for example. On the other hand, if the vehicle speed sensor is active, then the approaching spectrum is searched for the strongest target within the vehicle speed sensor window.

Once the target is acquired in block 220 or block 224, the target is tracked to monitor for changes in the ground speed of the patrol vehicle wherein at block 224 if the ground speed target is greater than the minimum acquisition value, the process continues to block 226 where the ground speed tracking flag is set and the approaching ground speed target frequency is saved at block 228 before advancing to block 210. If the ground speed target was not great enough, then the method advances directly to block 210 and the ground speed acquisition of blocks 218 through 228 will have to be performed again.

As previously discussed, at block 210, once the second buffer is full of data, the modulation state is set to frequency $f_1$ at block 230 and the next first buffer of data is acquired at block 232. While the data is being collected, the second buffer of data is processed and analyzed at blocks 234 through 238. The processing and analysis of blocks 234 through 238 is similar to the processing and analysis described in blocks 194 through 198, respectively. At block 240, if the ground speed tracking is enabled, then the methodology advances to block 244. Otherwise, the methodology returns to block 188. At block 244, the data collected at block 198 is compared to the data collected at block 238 to determine qualifying matches and the range and speed of target vehicles. At block 246, by previous selection by the operator, Opposite Lane closing speed is displayed by selecting the closest target approaching and subtracting the ground speed frequency from the target frequency. At block 248, by previous selection by the operator, Same Lane closing speed is displayed by selecting the closest target approaching or receding. If the target is approaching, then the speed is displayed by subtracting the target relative approaching frequency from the ground speed frequency. On the other hand, if the target is receding, then the speed is displayed by adding the target receding frequency to the ground speed frequency. The methodology then returns to block 188.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A vehicular traffic surveillance Doppler radar system, the system comprising:
    a source vehicle;
    a multiple vehicle environment comprising a plurality of target vehicles, each of the plurality of target vehicles having a range; and
    a direction-sensing Doppler radar associated with the source vehicle, the Doppler radar for performing a quadrature demodulation on reflected modulated FM signals received from at least a portion of the plurality of target vehicles and determining a range measurement for the at least a portion of the plurality of target vehicles based upon phase angle measurements derived therefrom.

2. The system as recited in claim 1, wherein the source vehicle comprises a law enforcement vehicle.

3. The system as recited in claim 1, wherein the direction-sensing Doppler radar is operable to determine which of the plurality of target vehicles are approaching and which are receding with respect to the source vehicle.

4. The system as recited in claim 1, wherein the source vehicle generates modulated FM signals which are transmitted to the at least a portion of the plurality of the target vehicles and reflected therefrom as reflected modulated FM signals.

5. The system as recited in claim 4, wherein each of the ranges of the at least a portion of the plurality of target vehicles is determined based upon phase angle measurements associated with the reflected modulated FM signals.

6. The system as recited in claim 4, wherein a speed of each of the at least a portion of the plurality of target vehicles is determined based upon frequency signal differentials associated with the modulated FM signals and reflected modulated FM signals.

7. A vehicular traffic surveillance Doppler radar system, the system comprising:
    a source vehicle;
    a multiple vehicle environment comprising a plurality of target vehicles, each of the plurality of target vehicles having a range with respect to the source vehicle, speed, and radar cross-section; and
    a direction-sensing Doppler radar associated with the source vehicle, the Doppler radar for performing Fourier transforms on reflected modulated FM signals received at the source vehicle and determining respective ranges and speeds of each of the plurality of target vehicles independently of the respective radar cross-sections of the plurality of vehicles.

8. The system as recited in claim 7, wherein the source vehicle comprises a law enforcement vehicle.

9. The system as recited in claim 7, wherein the direction-sensing Doppler radar is operable to determine which of the plurality of target vehicles are approaching and which are receding with respect to the source vehicle.

10. The system as recited in claim 7, wherein the source vehicle generates modulated FM signals which are transmitted to the plurality of target vehicles and reflected therefrom as reflected modulated FM signals.

11. A method for operating a vehicular traffic surveillance Doppler radar, the method comprising:
    transmitting modulated FM signals from a Doppler radar to first and second targets;
    receiving first reflected modulated FM signals at the Doppler radar from the first target;
    receiving second reflected modulated FM signals at the Doppler radar from the second target;
    transforming the received first and second reflected modulated FM signals to target spectrum;
    analyzing frequency signal differentials associated with the target spectrum to determine respective speeds of the first and second targets; and
    analyzing phase angle signal differentials associated with the target spectrum to determine respective ranges of the first and second targets.

12. The method as recited in claim 11, further comprising determining which of the first and second targets has a faster speed based on the respective speeds of the first and second targets.

13. The method as recited in claim 11, further comprising determining which of the first and second targets is closer based on the respective ranges of the first and second targets.

14. The method as recited in claim 11, further comprising determining the respective ranges of the first and second target vehicles independently of respective radar cross-sections of the first and second target vehicles.

15. The method as recited in claim 11, further comprising avoiding look-past error by calculating the respective ranges of the first and second target vehicles based upon the phase angle signal differentials.

16. A system for operating a vehicular traffic surveillance Doppler radar, the system comprising:

means for transmitting modulated FM signals from a Doppler radar to first and second targets;

means for receiving first reflected modulated FM signals at the Doppler radar from the first target;

means for receiving second reflected modulated FM signals at the Doppler radar from the second target;

means for transforming the received first and second reflected modulated FM signals to target spectrum;

means for analyzing frequency signal differentials associated with the target spectrum to determine respective speeds of the first and second targets; and means for analyzing phase angle signal differentials associated with the target spectrum to determine respective ranges of the first and second targets.

17. The system as recited in claim 16, further comprising means for determining which of the first and second targets has a faster speed based on the respective speeds of the first and second targets.

18. The system as recited in claim 16, further comprising means for determining which of the first and second targets is closer based on the respective ranges of the first and second targets.

19. The system as recited in claim 16, further comprising means for determining the respective ranges of the first and second target vehicles independently of respective radar cross-sections of the first and second target vehicles.

20. The system as recited in claim 16, further comprising means for avoiding look-past error by calculating the respective ranges of the first and second target vehicles based upon the phase angle signal differentials.

\* \* \* \* \*